United States Patent Office 3,748,325
Patented July 24, 1973

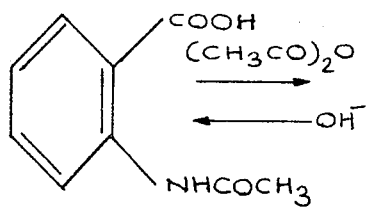
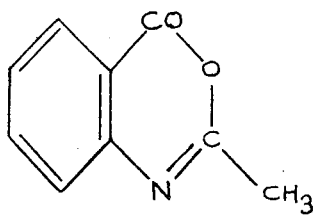
FIG. 1  FIG. 2
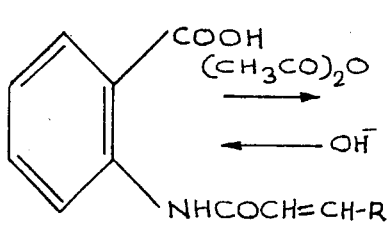
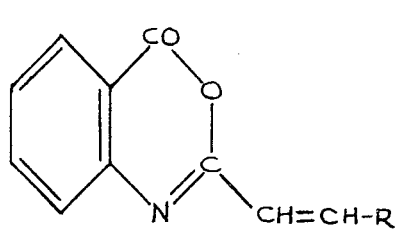
FIG. 3  FIG. 4
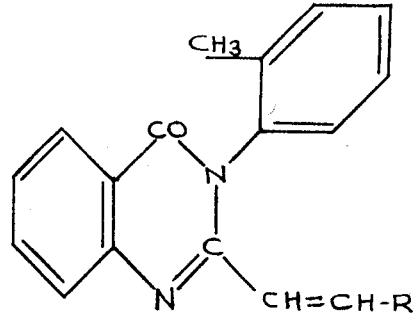
FIG. 5

3,748,325
PROCESS FOR THE PREPARATION OF
QUINAZOLINONE DERIVATIVES
Shankar Somasekhara and Vijaya Shanker Dighe, both
c/o Karamchand Premchand Private Ltd., Sarabhai
Research Centre, Wadi Wadi, Post Box 162, Baroda-7,
Gujarat, India
Filed Oct. 5, 1970, Ser. No. 78,142
Claims priority, application India, Apr. 6, 1970,
126,066
Int. Cl. C07d 51/48
U.S. Cl. 260—240 E                              4 Claims

ABSTRACT OF THE DISCLOSURE

This invention relates to the preparation of quinazolinone derivatives of the general formula as shown in FIG. V of the accompanying drawings wherein R is 2-, 3- or 4-pyridyl and their acid addition salts.

These quinazolinone compounds are of pharmacological interest and have been found to possess sedative, hypnotic and anticonvulsant properties.

---

The process for preparing the quinazolinone derivatives of the general formula as shown in FIG. V of the accompanying drawings wherein R is 2-, 3- or 4-pyridyl, consists of reacting (i) acetylanthranilic acid, as shown in FIG. I, with pyridine carboxaldehyde (2, 3 or 4) in acetic acid and acetic anhydride at 80° to 110° C. for 1 to 3 hours, to obtain compounds of the general formula as shown in FIG. III, wherein R is 2-, 3- or 4-pyridyl, where are then reacted with o-toluidine in a solvent like dry benzene, dry toluene, dry pyridine or dry picoline, in presence of phosphorus trichloride, phosphorus oxychloride or thionyl chloride, at 60°–100° C., permitted by the solvent used; (ii) 2-methyl-3,1-benzoxazin-4-one as shown in FIG. II, which is obtained from acetylanthranilic acid (FIG. I) by methods known per se, with pyridine carboxaldehyde (2, 3 or 4) in acetic acid and acetic anhydride at 80–100° C. for 1 to 3 hours to obtain compounds of the general formula as shown in FIG. IV wherein R is 2-, 3- or 4-pyridyl, which are then reacted with o-toluidine in a solvent-like dry benzene, dry toluene, dry pyridine or dry picoline, in presence of phosphorus trichloride, phosphorus oxychloride, or thionyl chloride, at 60°–100° C., permitted by the solvent used. Compounds of the general formula as shown in FIG. V are also obtained from compounds of the general formula as shown in FIG. III, which are in turn obtained from compounds of the general formula as shown in FIG. IV (wherein R is the same for all 2-, 3- or 4-pyridyl) by reaction with alkali and subsequent neutralisation; and compounds of the general formula as shown in FIG. V are also obtained from compounds of the general formula as shown in FIG. IV which are in turn obtained from compounds of the general formula as shown in FIG. III (wherein R is the same for all 2-, 3- or 4-pyridyl) by reaction with acetic anhydride.

The acid addition salts of the compounds of the general formula as shown in FIG. V are prepared by methods known per se.

In accordance with this invention there is provided a process for the preparation of the compounds of the general formula as shown in FIG. V wherein R is 2-, 3- or 4-pyridyl, and their acid addition salts, which comprises reacting (i) compounds of the general formula as shown in FIG. III wherein R is 2-, 3- or 4-pyridyl (which are obtained either by reacting acetylanthranilic acid (FIG. I) with pyridine carboxaldehyde (2, 3 or 4) in acetic acid and acetic anhydride or by reacting compounds of the general formula as shown in FIG. IV wherein R is 2-, 3- or 4-pyridyl with alkali and subsequent neutralisation) with o-toluidine in a solvent, at 60–100° C., and in presence of a condensing agent; of (ii) compounds of the general formula as shown in FIG. IV wherein R is 2-, 3- or 4-pyridyl (which are obtained either by reacting 2-methyl-3,1-benzoxazin-4-one (FIG. II) with pyridine carboxaldehyde (2, 3 or 4) in acetic acid and acetic anhydride or by reacting compounds of the general formula as shown in FIG. III wherein R is 2-, 3- or 4-pyridyl with acetic anhydride) with o-toluidine in a solvent, at 60°–100° C., and in presence of a condensing agent; the acid addition salts of the compounds of the general formula as shown in FIG. V wherein R is 2-, 3- or 4-pyridyl are prepared by methods known per se.

The following examples are given by way of illustrations.

EXAMPLE 1

N-(o-carboxyphenyl)-β-(3-pyridyl)-acrylamide

N-acetylanthranilic acid (5.4 g.; 0.03 mole) and pyridine-3-carboxaldehyde (3.2 g.; 0.03 mole) were heated at 100° C. with acetic acid (10 ml.) and acetic anhydride (10 ml.) for 2 hours. Acetic acid and acetic anhydride were distilled off in vacuo. The residue was dissolved in warm sodium hydroxide solution clarified with carbon, filtered, brought to pH 7 with concentrated hydrochloric acid and acidified with acetic acid (1 ml.) when the title product separated out as an off-white solid. It was crystallised from aqueous ethanol; M.P. 245–6° (D.).

EXAMPLE 2

2-(2-(3-pyridyl)vinyl)-3,1-benzoxazin-4-one 2-methyl-3,1-benzoxazin-4-one (4.8 g.; 0.03 mol) and pyridine-3-carboxaldehyde (3.2 g.; 0.03 mole) were heated at 100° C. with acetic acid (10 ml.) and acetic anhydride (10 ml.) for 3 hours. Acetic acid and acetic anhydride were distilled off in vacuo. The residue was recrystallised from benzene-hexane to obtain the title product melting at 118–20° C.

EXAMPLE 3

N-(o-carboxyphenyl-β-(3-pyridyl)-acrylamide 2-(2-(3-pyridyl)vinyl)-3,1-benzoxazin-4-one (2.5 g.; 0.01 mole) was dissolved in warm sodium hydroxide solution (1 N; 20 ml.). The solution was filtered and brought to pH 7 with hydrochloric acid and then acidified with acetic acid (1 ml.) to obtain the crude title product. It was crystallised from aqueous ethanol; M.P. 244–6° (D.).

EXAMPLE 4

2-(2-(3-pyridyl)vinyl)-3,1-benzoxazin-4-one

N-(o-carboxyphenyl)-β-(3-pyridyl)-acrylamide (2.7 g.; 0.01 mole) was refluxed for 30 minutes with acetic anhydride (5 ml.). The acetic formed and the excess of acetic anhydride were distilled off in vacuo. The residue was crystallised from benzene-hexane to obtain the title product melting at 118–20° C.

EXAMPLE 5

2-(2-(3-pyridyl)vinyl)-3-o-tolyl-3,4-dihydro-
quinazolin-4-one

N-(o-carboxyphenyl)-β-(3-pyridyl)-acrylamide (5.3 g.; 0.02 mole) and o-toluidine (2.14 g.; 0.02 mole) were taken in dry pyridine (10 ml.). The suspension was cooled to 5° C. Phosphorusoxychloride (1 ml.) was added dropwise. The reaction mixture was then heated to 80° C. and stirred for one hour. The reaction product was cooled and diluted with water. The solid sticky product was triturated with 2 N sodium hydroxide solution. The insoluble solids were crystallised from benzene-acetone-hexane to obtain the title product melting at 198–200° C.

EXAMPLE 6

2-(2-(3-pyridyl)vinyl)-3-o-tolyl-3,4-dihydroquinazolin-4-one

The reaction was carried out as in Example 5; phosphorustrichloride (1 ml.) was used instead of phosphorusoxychloride. After working up the reaction product as in Example 5, the title product, melting at 198–200° C. was obtained.

EXAMPLE 7

2-(2-(3-pyridyl)vinyl)-3-o-tolyl-3,4-dihydroquinazolin-4-one

2-(2-(3-pyridyl)vinyl)-3,1-benzoxazin - 4 - one (2.5 g.; 0.01 mole) and o-toluidine (1.1 g.; 0.01 mole) were taken in dry picoline (10 ml.). Thionylchloride (1 ml.) was added dropwise to the above suspension at 5° C. The reaction mixture was then stirred and heated at 70° C. for one hour. It was then cooled and diluted with water. The sticky solid product thus obtained was triturated with 2 N sodium hydroxide solution. The solid residue was then crystallised from acetone-benzene-hexane to obtain the title product melting at 198–200° C.

EXAMPLE 8

2-(2-(2-pyridyl)vinyl)-3-o-tolyl-3,4-dihydroquinazolin-4-one

2-(2-(2-pyridyl)vinyl)-3,1-benzoxazin - 4 - one (2.5 g.; 0.01 mole) and o-toluidine (1.1 g.; 0.01 mole) were taken in dry pyridine (5 ml.). The cooled suspension (5° C.) was treated with phosphorus-trichloride (0.5 ml.). The reaction mixture was then stirred and heated at 60° C. for 2 hours. It was then cooled and diluted with water. The resulting solid was triturated with 2 N sodium hydroxide solution. The insoluble solids were crystallised from benzene-hexane to obtain the title product melting at 193–95° C.

Using dry benzene (50 ml.) as solvent instead of pyridine in the above experiment, did not make any difference to the product isolated.

EXAMPLE 9

2-(2-(4-pyridyl)vinyl)-3-o-tolyl-3,4-dihydroquinazolin-4-one

2-(2-(4-pyridyl)vinyl)-3,1-benzoxazin - 4 - one (2.5 g.; 0.01 mole) and o-toluidine (1.1 g.; 0.01 mole) were taken in dry pyridine (5 ml.). The cooled suspension (5° C.) was treated with phosphorustrichloride (0.5 ml.) The reaction mixture was then stirred and heated at 100° C. for 1 hour. It was then cooled and poured into water. The solids thus obtained were triturated with 1 N NaOH and then crystallised from benzene-hexane to obtain the title product melting at 170–72° C.

EXAMPLE 10

2-(2-(3-pyridyl)vinyl)-3-o-tolyl-3,4-dihydroquinazolin-4-one dihydrochloride

2-(2-(3-pyridyl)vinyl) - 3 - o - tolyl - 3,4-dihydroquinazolin-4-one (1 g.) was dissolved in benzene (10 ml.) and dry acetone (10 ml.). HCl gas was passed into it, when a pale-yellow solid separated out. It melted at 248° C. and it analysed for the title product.

We claim:

1. A process for the preparation of compounds of the general Formula V

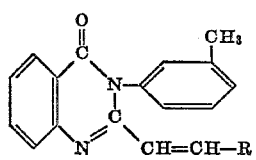

(V)

where R is selected from the group consisting of pyrid-2yl, pyrid-3yl and pyrid-4yl, which comprises reacting an acylanthranilic acid of Formula I

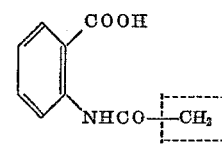

(I)

with an aldehyde of formula R—CHO, where R is as defined hereinabove, then reacting the resulting aza-cinnamoylanthranilic acid of Formula III

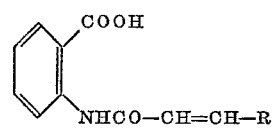

(III)

with o-toluidine to obtain the said compound of Formula V.

2. A process as claimed in claim 1 wherein the compound of Formula III is converted to the corresponding cyclized pyridyl-vinyl benzoxazinone derivative of Formula IV

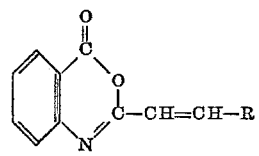

(IV)

by cyclization using acetic anhydride and the compound of Formula IV is then reacted with o-toluidine to obtain said compound of Formula V.

3. A process as claimed in claim 1 wherein the reaction with o-toluidine is carried out using condensation catalyst selected from the group consisting of phosphorustrichloride, phosphorus oxychloride and thionyl chloride in the presence of an organic solvent at temperatures in the range of 60° to 100° C.

4. A process as claimed in claim 1 wherein the reaction with the aldehyde of formula R—CHO is carried out at temperatures in the range of 80° to 110° in the presence of acetic acid and acetic anhydride mixtures.

References Cited

UNITED STATES PATENTS

| | | | |
|---|---|---|---|
| 3,194,806 | 7/1965 | Boltze et al. | 260—240 E |
| 3,238,203 | 3/1966 | Krapcho | 260—247.2 A |

OTHER REFERENCES

Chemical Abstracts, vol. 71, abstract No. 3354v, p. 315 (1969).

Patai, The Chemistry of Amides, pp. 754 to 759 (Interscience Publishers, New York, 1970).

JOHN D. RANDOLPH, Primary Examiner

U.S. Cl. X.R.

260— 240 J, 244 R, 558 P, 562 R; 424—251